United States Patent
Sakai

[11] Patent Number: 5,157,270
[45] Date of Patent: Oct. 20, 1992

[54] RESET SIGNAL GENERATING CIRCUIT

[75] Inventor: Shinji Sakai, Kanagawa, Japan

[73] Assignee: Canon Kabushiki Kaisha, Tokyo, Japan

[21] Appl. No.: 649,142

[22] Filed: Feb. 1, 1991

Related U.S. Application Data

[63] Continuation of Ser. No. 261,908, Oct. 24, 1988, abandoned.

[30] Foreign Application Priority Data

Oct. 31, 1987 [JP] Japan .................................. 62-277103
Oct. 31, 1987 [JP] Japan .................................. 62-277104

[51] Int. Cl.$^5$ ................................................ H02J 9/06
[52] U.S. Cl. ..................................... 307/66; 365/228; 371/66
[58] Field of Search .................. 323/282, 901; 363/49; 365/226, 227, 228, 229; 364/184, 187; 395/750; 371/16.3, 66; 307/46, 64, 66

[56] References Cited

U.S. PATENT DOCUMENTS

| 4,327,298 | 4/1982 | Burgin | 307/66 |
| 4,375,663 | 3/1983 | Arcara et al. | 365/226 X |
| 4,410,991 | 10/1983 | Lenart | 371/66 |
| 4,419,619 | 12/1983 | Jindrick et al. | 323/257 |
| 4,433,390 | 2/1984 | Carp et al. | 365/228 X |
| 4,586,179 | 4/1986 | Sirazi et al. | 371/66 X |
| 4,628,431 | 12/1986 | Kayser | 323/901 X |
| 4,638,465 | 1/1987 | Rosini et al. | 365/228 |
| 4,672,585 | 6/1987 | Nollet | 365/228 |
| 4,716,521 | 12/1987 | Nagae | 395/750 |
| 4,750,040 | 6/1988 | Hakamada | 365/229 X |

FOREIGN PATENT DOCUMENTS 0138655 7/1985 Japan .................................. 365/228

Primary Examiner—Steven L. Stephan
Assistant Examiner—Kristine Peckman
Attorney, Agent, or Firm—Robin, Blecker, Daley & Driscoll

[57] ABSTRACT

A reset signal generating circuit comprises a switching circuit arranged to supply an on/off control signal to a switching element which controls an on/off action of a power source; and a reset circuit arranged to detect the level of the on/off control signal and to forcedly produce a reset signal before the power source is turned off.

8 Claims, 8 Drawing Sheets

RESET SIGNAL GENERATING CIRCUIT

This is a continuation application under 37 CFR 1.62 of prior application Ser. No. 261,908, now abandoned filed Oct. 24, 1988.

BACKGROUND OF THE INVENTION

1. Field of the Invention

This invention relates to a circuit which is arranged to generate a reset signal when the output of a power source comes to a stop.

2. Description of the Related Art

The conventional reset signal generating circuit of the above stated kind has been arranged to produce a reset signal which becomes active or enabled (i) until the lapse of a given period of time after a power supply is switched on; (ii) until the lapse of a given period of time after the voltage of power supply has reached a given value; or (iii) when the power supply voltage drops to a value lower than a given value.

FIG. 1 of the accompanying drawings is a wave form chart showing the operation of a reset signal generating circuit of that kind. As shown, the voltage of the power supply gradually rises when a power supply control signal which indicates switching on of the power supply changes from an off-state to an on-state. At this time, the reset signal is in an active state. A timer which is not shown begins to operate when the supply voltage comes to exceed a given detection level. Then, after the lapse of a period of time T, the state of the reset signal becomes inactive. In other words, a reset state is canceled when the power supply voltage is sufficiently stabilized.

The power supply voltage begins to gradually drop when the power supply control signal conversely changes from the on-state to the off-state. However, the reset signal remains in the inactive state until the supply voltage becomes lower than the detection level. The reset signal becomes active when the power supply voltage becomes lower than the detection level.

With a level detecting circuit arranged in combination with a timer in this manner, a reset state can be canceled only after the power supply voltage reaches a sufficient value. When the power supply is turned off, however, the reset signal becomes active after the power supply voltage becomes lower than a given level. This, therefore, tends to cause some error to take place within the body of a system.

Generally, the error of this kind does not present any serious problem as it takes place immediately before the power supply turns off. However, it tends to become a serious problem for a system of the kind arranged to store some necessary data in a backup memory, an $E^2$-PROM (electrically erasable programmable read-only memory) or the like.

SUMMARY OF THE INVENTION

It is therefore an object of this invention to provide a reset signal generating circuit which is arranged to turn a reset signal into an active state prior to a drop in a power supply voltage.

To attain this object, a reset signal generating circuit embodying this invention comprises in combination switching means for supplying an on/off control signal to a switching element which performs on/off control over a power supply; and reset means arranged to detect the level of the on/off control signal and to forcedly produce a reset signal. The arrangement to detect the level of the on/off control signal which controls the power supply and to forcedly generate the reset signal enables the reset signal generating circuit to reset the body of a system before the level of the power supply voltage substantially drops. The embodiment, therefore, effectively lessens the possibility of a faulty operation of the system.

Another embodiment of the invention comprises switching means for supplying an on/off control signal to a switching element which on/off controls a power supply; processing means for controlling the operation of the switching means; and a reset means which forcedly produces a reset signal in response to the output of the processing means. Therefore, the reset signal which is forcedly generated in response to the power supply on/off control signal enables the body of a system to be reset before the power supply voltage drops.

The above and other objects and features of the invention will become apparent from the following detailed description of embodiments thereof taken in connection with the accompanying drawings.

DETAILED DESCRIPTION OF THE PREFERRED EMBODIMENTS

Figure 1:
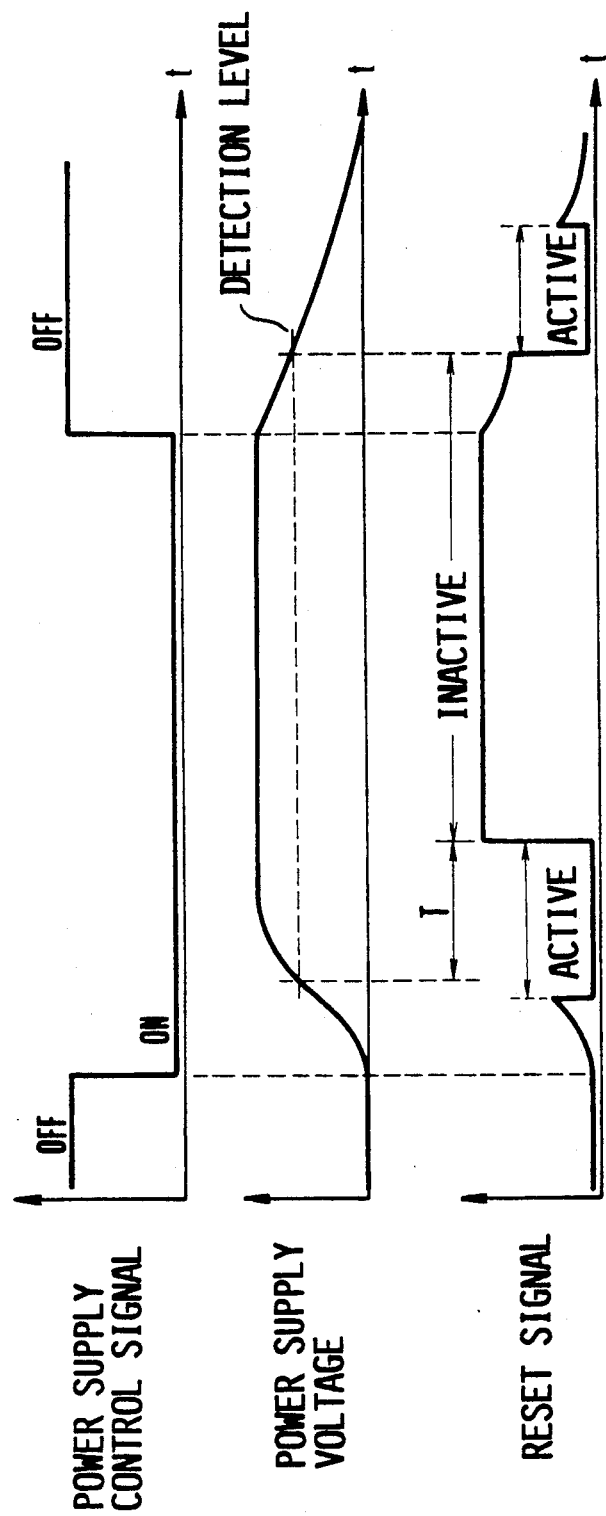
FIG. 1 is a waveform chart showing the prior art.
Figure 2A:
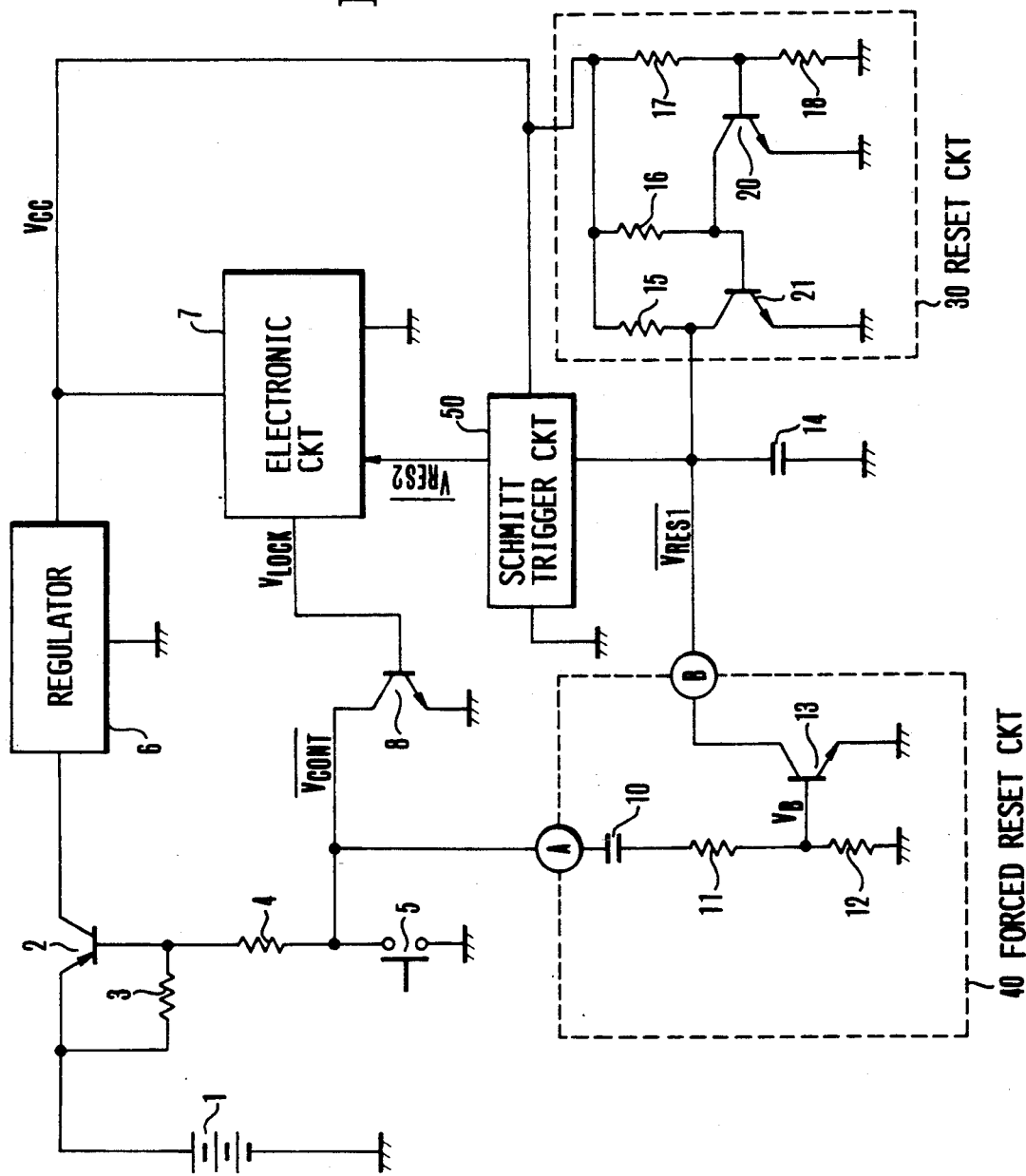
FIG. 2(a) is a circuit diagram showing the whole arrangement of a first embodiment of this invention.

In the following, the details of this invention will be described through embodiments thereof:

FIG. 2(a) shows in a circuit diagram a first embodiment of the invention. The illustration includes a battery 1; a manual operation switch 5; a regulator 6 which is arranged to produce a stabilized DC voltage $V_{CC}$; an electronic circuit 7 which is receiving a power supply; a reset circuit 30 which is arranged to generate a first reset signal $V_{\overline{RES1}}$; a forced reset circuit 40 which is arranged to forcedly lower the level of the first reset signal $V_{\overline{RES1}}$; a Schmitt trigger circuit 50 which is arranged to produce a second reset signal $V_{\overline{RES2}}$; switching transistors 2, 8, 13, 20 and 21; resistors 3, 4, 11 and 15 to 18; and capacitors 10 and 14.

Figure 2B:
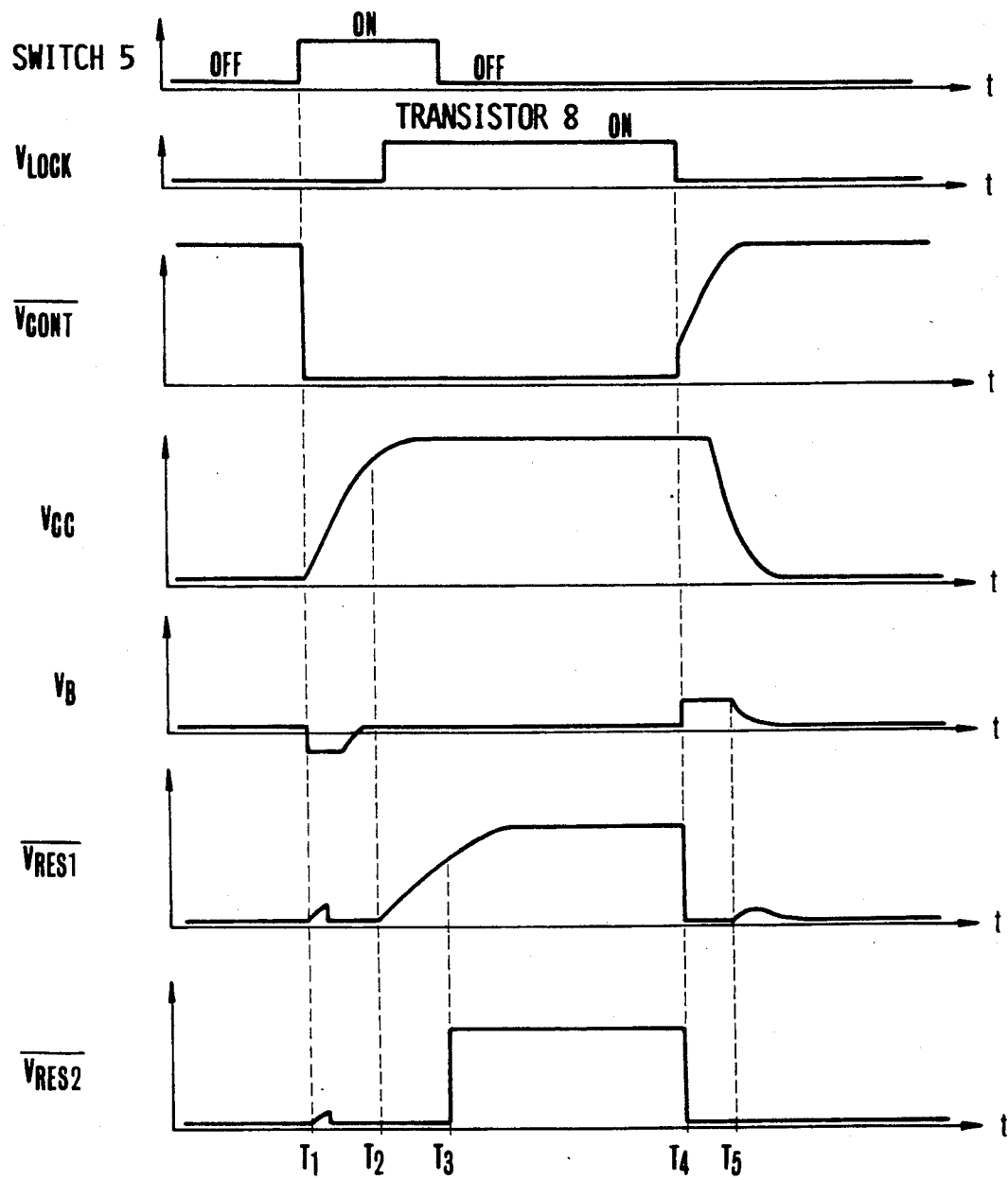
FIG. 2(b) is a waveform chart showing the operation of the first embodiment.

Referring to FIG. 2(b) which is a waveform chart, the first embodiment of the invention operates in the following manner: When the switch 5 is closed at a a point of time T1, the transistor 2 turns on. The voltage $V_{CC}$ which is produced from the regulator 6 then gradually rises. Since the transistor 20 is off at that time, the transistor 21 turns on. The first reset signal $V_{\overline{RES1}}$ (the collector potential of the transistor 21) is at a low level. When the voltage $V_{CC}$ has risen to a certain level at a point of time T2, the transistor 20 turns on. Therefore, the transistor 21 turns off. The capacitor 14 is charged. As a result, the level of the signal $V_{\overline{RES1}}$ begins to rise. This signal is applied to the Schmitt trigger circuit 50 (a buffer circuit 50 having a hysteresis). Therefore, the second reset signal V$_{\overline{RES2}}$ is applied to the electronic circuit 7 at a point of time T3 to cancel a reset state.

When the electronic circuit 7 thus begins to operate, a signal V$_{\overline{LOCK}}$ which is produced from the electronic circuit 7 remains at a high level. This causes the transistor 8 to turn on. Therefore, the transistor 2 is kept in an on-state even after the switch 5 is opened. As a result, the regulator 6 is kept in connection with the battery 1. After that, when electronic circuit 7 is turned off, the level of the signal V$_{\overline{LOCK}}$ becomes low to turn off the transistor 8 (at a point of time T4). Then, the collector potential V$_{\overline{CONT}}$ of the transistor 8 instantly rises to raise the base potential V$_B$ of the transistor 13. This causes the transistor 13 to turn on. Then, since the level of the signal V$_{\overline{RES1}}$ changes to a low level at this time point T4, the level of the signal V$_{\overline{RES2}}$ which is applied to the electronic circuit 7 also becomes low. In other words, the circuit 7 is reset the instant the level of the signal V$_{\overline{LOCK}}$ becomes low at the point of time T4.

After that, the transistor 2 turns off when the potential V$_{\overline{CONT}}$ rises. Therefore, the voltage V$_{CC}$ which is the output of the regulator 6 also comes to gradually drop. The potential V$_{\overline{CONT}}$ rises eventually up to the voltage of the battery 1. During this period, a current flowing through the resistor 3 and between the emitter and base of the transistor 2 flows to the ground via the resistor 4, the capacitor 10, the resistor 11, the resistor 12 and between the base and emitter of the transistor 13.

A current I which flows while the transistors 2 and 13 are in an on-state can be expressed as follows:

$$I \approx (VBATT - 2 \times VBE - V_{C10})/(R4 + R11)$$

wherein, VBATT represents a voltage of the battery 1; VBE a voltage (about 0.6 volt) between the base and emitter of the transistors 2 and 13; V$_{C10}$ a voltage between terminals of the capacitor 10; R4 the value of the resistor 4; and R11 the value of the resistor 11.

Therefore, the current I gradually decreases accordingly as the capacitor 10 is charged. The resistance value of the resistor 3 is assumed to be R3 and that of the resistor 12 to be R12. The value R12 is arranged to be larger than the value R3. Meanwhile, the output of the transistor 2 is much larger than that of the transistor 13 as the latter is only a part of the former. Therefore, there is the following relation:

$$(I - IB2)/R3 < VBE$$

wherein IB2 represents the base current of the transistor 2.

Therefore, the input current to the regulator 6 is cut off and, as mentioned above, the voltage V$_{CC}$ comes to gradually decrease. Following this, there is the following relation:

$$(I - IB13)/R12 < VBE$$

wherein IB13 represents the base current of the transistor 13.

Then, the transistor 13 comes to be incapable of remaining in an on-state any longer. The signal V$_{\overline{RES1}}$ rises to some degree due to the pull-up effect of the voltage V$_{CC}$. However, since the level of the voltage V$_{CC}$ has become sufficiently low by then, this brings about no problem.

The arrangement of the forced reset circuit 40 which is shown in FIG. 2(a) may be variously changed, for example, as shown in FIGS. 3 to 7.

In the case of the forced reset circuit 40 of FIG. 2(a), the potential V$_{\overline{CONT}}$ slowly rises because of the insertion of the capacitor 10. This enables the cut-off time of the battery voltage applied to the regulator 6 to be delayed. In other words, the power supply turns off some period of time after the reset signal V$_{\overline{RES2}}$ is produced. This protects the body of the system and is an advantage in terms of safety. However, the arrangement necessitates use of the capacitor 10, which is not suitable for preparation of the circuit 40 in the form of an integrated circuit. Whereas, the circuits shown in FIGS. 3, 4 and 5 solve this problem by the use of MOSFET transistors. This prevents any current from flowing into the circuit from the battery even when the level of the potential V$_{\overline{CONT}}$ becomes high.

Figure 3:
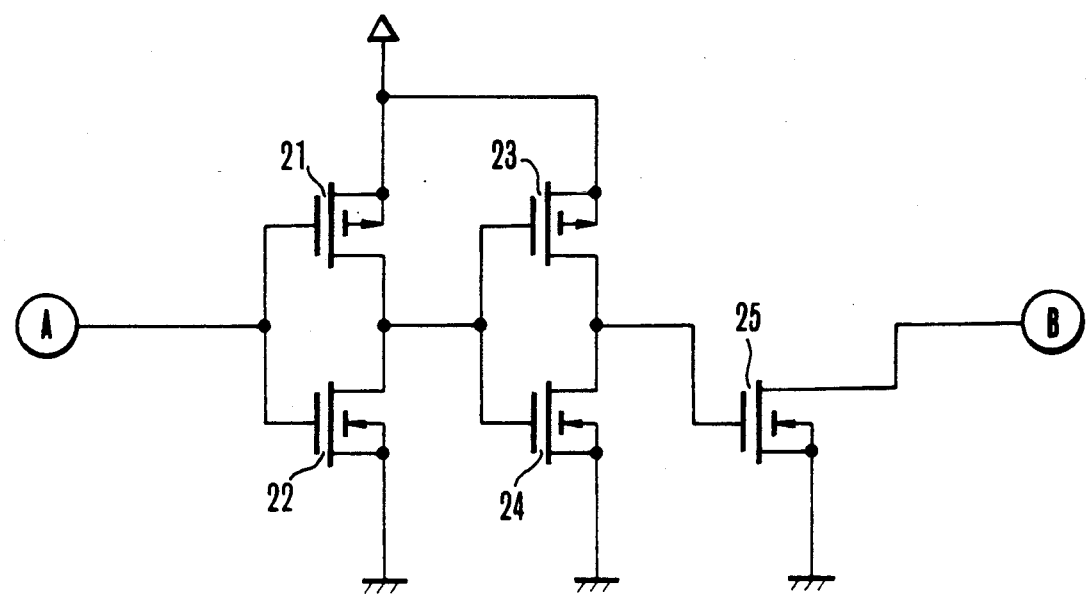
FIGS. 3 to 7 are circuit diagrams showing different arrangement examples differing from the arrangement of a forced reset circuit shown in FIG. 2(a).
Figure 4:
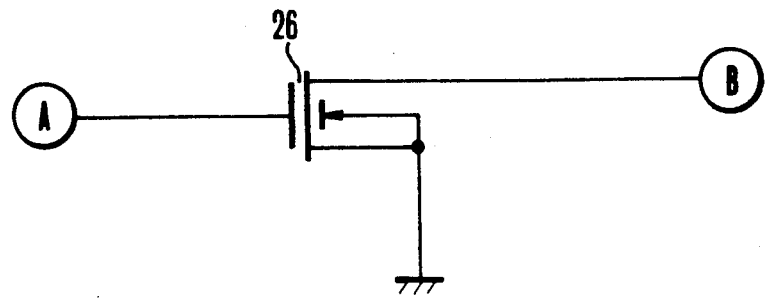
Figure 5:
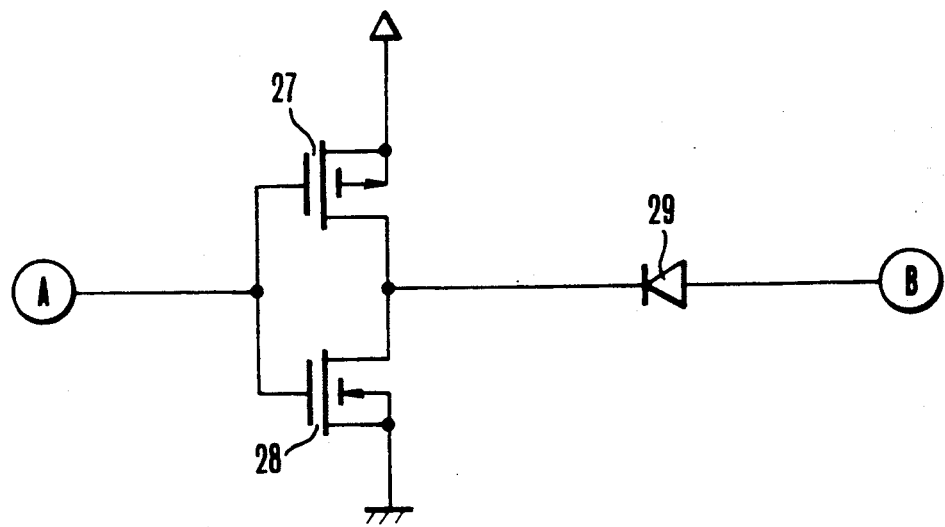

FIG. 3 shows an open-drain-output type inverter circuit which is composed of ordinary CMOS's 21 to 25. FIG. 4 shows a circuit using one open-drain type MOS transistor 26. This circuit is simpler than the circuit of FIG. 3. The former, however, is incapable of giving a sharp change-over characteristic because of a lower gain. FIG. 5 shows a circuit having a diode 29 connected to the rear of a buffer consisting of CMOS's 27 and 28. The circuit of FIG. 5 functions in the same manner as the circuits of FIGS. 3 and 4.

Figure 6:
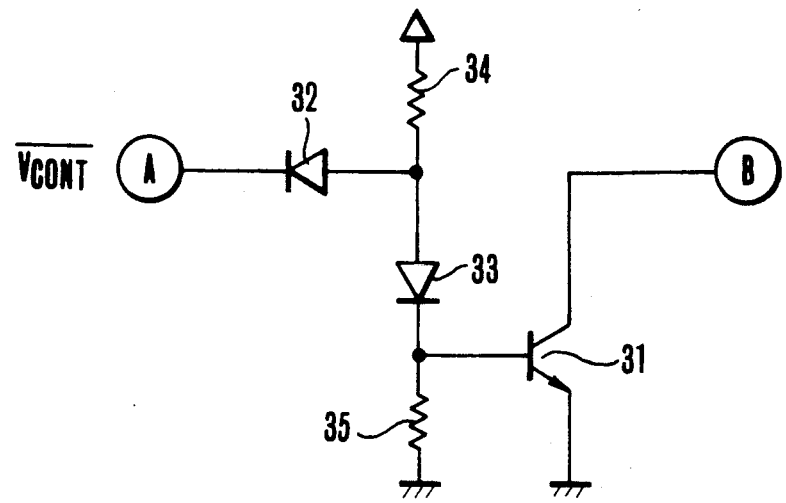
Figure 7:
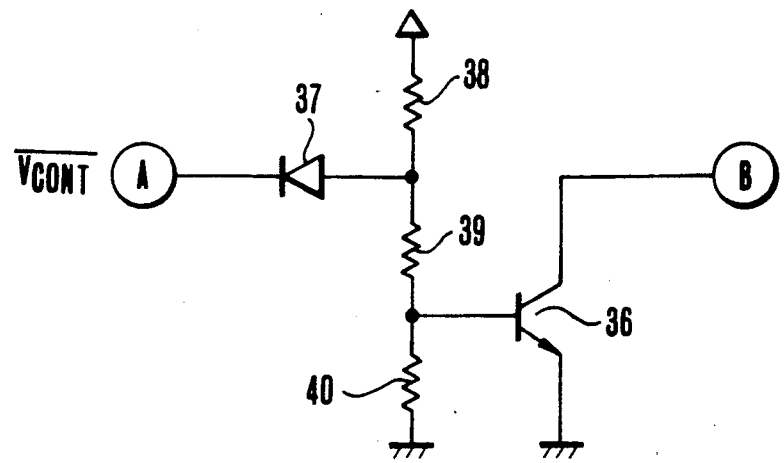

In each of the circuits shown in FIGS. 6 and 7, a bipolar transistor 31 or 36, diodes 32 and 33 or a diode 37 and resistors 34 and 35 or 38 to 40 are arranged in such a manner as to prevent any unnecessary current from flowing into the circuit. More specifically, when the potential V$_{\overline{CONT}}$ is at a low level, the voltage of a terminal A is at a low level and, therefore, that of the base of the transistor 31 or 36 is at a low level. When the voltage of the terminal A rises, the transistor 31 or 36 turns on. This action becomes unstable when the voltage V$_{CC}$ drops. However, it presents no problem because the reset circuit 30 of FIG. 2(a) operates when the voltage V$_{CC}$ drops. The circuit shown in FIG. 6 is of the threshold fixed type while the circuit shown in FIG. 7 is of the threshold variable type. Both of them use no MOS transistor. Each of them is, therefore, highly suited for preparation of the circuit in the form of IC.

The first embodiment of the invention which is arranged in the manner as described above is capable of effectively preventing errors of varied kinds resulting from a drop in the power supply voltage because the reset signal is turned into an active state before the power supply voltage drops.

Figure 8:
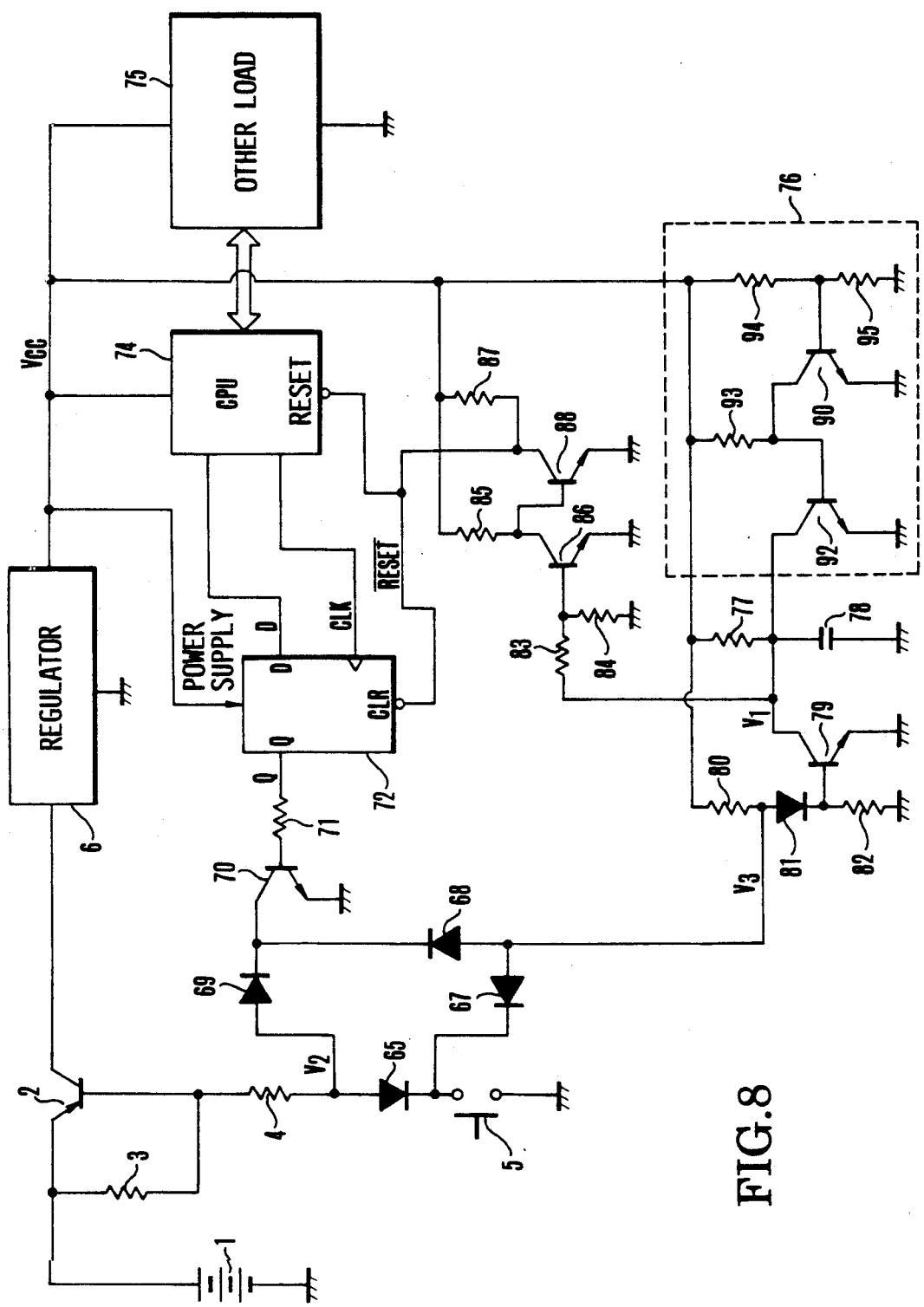
FIG. 8 is a circuit diagram showing a second embodiment of the invention.

A second embodiment of the invention is arranged as follows: FIG. 8 is a circuit diagram showing the second embodiment. The illustration includes a battery 1; a manual operation switch 5; a D type flip-flop 72; a regulator 6 which is arranged to produce a stabilized DC voltage; a CPU 74; some other load 75 that is connected to the CPU 74; a voltage detecting circuit 76; bipolar transistors 2, 70, 79, 86, 88, 90 and 92; diodes 65, 67, 68, 69 and 81; resistors 3, 4, 71, 77, 80, 82 to 85, 87 and 93 to 95; and a capacitor 78.

Figure 9:
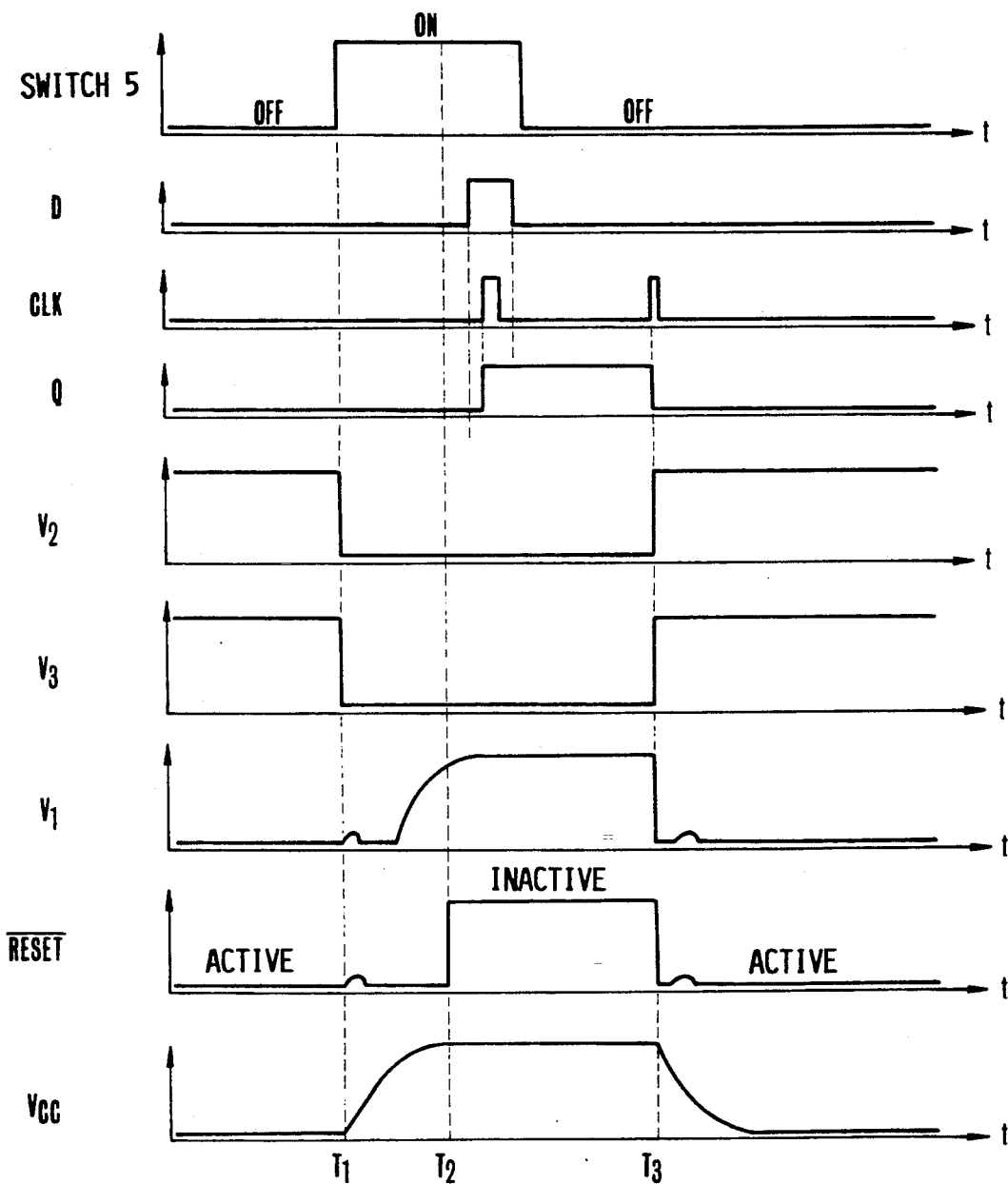
FIG. 9 is a waveform chart showing the operation of the second embodiment.

Referring to FIG. 9 which is a waveform chart, the second embodiment operates as follows: When the switch 5 is closed at a point of time T1, the potential at the base of the transistor 2 drops. The transistor 2 therefore turns on. By this, the regulator 6 is connected to the battery 1. The output voltage V$_{CC}$ of the regulator 6 gradually rises. At this time, the voltage V3 on the anode side of the diode 67 is clamped at about 1 VBE (voltage between the base and the emitter: about 0.6 volt). The transistor 79 is therefore in an off-state.

When the voltage $V_{CC}$ comes to reach a given value after the lapse of a period of time, the transistor 90 turns on. This causes the transistor 92 to turn off. As a result, a current flows via the resistor 77 to the capacitor 78. This causes a voltage V1 to gradually rise. This voltage V1 is divided by the resistors 83 and 84. The divided voltage is applied to the base of the transistor 86. The transistor 86 turns on. The transistor 88 turns off. The collector voltage of the transistor 88 is thus pulled up by the resistor 87. As a result, the level of a signal $\overline{RESET}$ becomes high at a point of time T2. A reset state is canceled by this. The CPU 74 begins to operate.

After this, when a signal D and a clock pulse signal CLK are produced from the CPU 74, the level of the Q output of the flip-flop 72 becomes high. The transistor 70 turns on. Therefore, the transistor 2 is kept in its on-state even when the switch 5 is opened.

When the power supply is to be switched off under the above stated condition, the CPU 74 produces the clock pulse signal CLK at a point of time T3. This lowers the level of the Q output of the flip-flop 72 to turn off the transistor 70. Assuming that the switch 5 is in an open state at that time, the diodes 65, 67, 68 and 69 act to bring both voltages V2 and V3 up to high levels. The transistor 2 is turned off by this. The voltage $V_{CC}$, therefore, gradually drops. At the same time (time point T3), a high level voltage V3 is applied to the base of the transistor 79 to turn it on. As a result, an electric charge accumulated at the capacitor 78 is discharged via the transistor 79. Therefore, the voltage V1 instantly drops to a low level. With the voltage V1 dropped to the low level, the transistor 86 turns off. This causes the transistor 88 to turn on and the level of the signal $\overline{RESET}$ to become low.

The signal $\overline{RESET}$ thus becomes active the instant the level of the signal Q (the output of the flip-flop 72) which on/off controls the power supply becomes low.

A direct clearing action on the D type flip-flop 72 is performed as follows: The level of the clear input terminal CLK is pulled down to a low level by the transistor 88 while the CPU 74 is being reset (when the power supply is turned on or off) as mentioned in the foregoing. Therefore, the level of the signal Q which is arranged to turn on the transistor 70 never becomes high even if the CPU 74 happens to perform a faulty action.

A drop in the power supply voltage tends to result in a faulty action of the CPU 74. In the event of a power supply voltage drop, however, the level of the voltage V1 becomes low. Therefore, when the CPU 74 is reset, the flip-flop 72 is also reset so that, in this instance, the power supply can be cut off.

Some of CPUs has recently come to be equipped with the so-called watch dog timer. The CPU of this kind has a reset terminal arranged to operate as an input/output terminal. The CPU is reset with the level of the reset terminal lowered from outside. When a faulty action of the CPU is found by the watch dog timer, the CPU is reset by itself and, at the same time, the level of the terminal is changed to a low level to show this to the outside. In case that the CPU of the embodiment is of that kind, the flip-flop 72 of the circuit shown in FIG. 8 can be cleared also when an "abnormality" reset signal is generated from the CPU. The power supply, therefore, can be cut off even in that instance.

The above stated cut-off action is important particularly in the case of a so-called "latch-up" abnormality which does not allow the CPU to be recovered by a normal cut-off action. In other words, the CPU can be released from a latched-up state by turning off the power supply although the CPU is then unrecoverable by the normal resetting action. After that, the embodiment can be allowed to resume a completely normal operation by closing the switch 5 to turn on the power supply.

The direct clearing function which is described above greatly enhances the safety of the system. In the foregoing description, the watch dog timer is assumed to be disposed within the CPU. However, the same advantageous effect is of course attainable by means of some suitable check device arranged outside of the CPU.

The second embodiment of the invention, as described in the foregoing, is capable of turning the reset signal into an active state prior to a complete drop in the power supply voltage. Therefore, faulty actions of varied kinds can be prevented from following a drop in the power supply voltage.

What is claimed is:

1. A reset signal generating circuit comprising:
   a power source for supplying electric power to a load circuit including a microcomputer and a regulator, said regulator providing electric power at a predetermined voltage level to said microcomputer;
   switching control means for supplying an on/off control signal to a switching element for controlling an on/off action of said power source; and
   reset means for producing a reset signal for resetting said microcomputer in response to an output of said switching control means at a time before the voltage level provided by said regulator drops below said predetermined voltage level.

2. A circuit according to claim 1, wherein said reset means resets said microcomputer before the power supply to said load circuit is turned off by said switching element.

3. A reset signal generating circuit comprising:
   switching means for supplying an on/off signal to a switching element which controls an on/off action of a power source, said power source including a regulator for providing electric power at a predetermined voltage level to a load circuit, said load circuit including a microcomputer; and
   reset means for detecting a level of said on/off signal and for producing a reset signal, said reset signal resetting said microcomputer at a time before the voltage level provided by said regulator drops below said predetermined voltage level.

4. A circuit according to claim 3, wherein said reset means resets said microcomputer before the power supply to said load circuit is turned off by said switching element.

5. A reset signal generating circuit comprising:
   a) a power source;
   b) a regulator for stabilizing an output of said power source to a predetermined voltage level;
   c) a load circuit connected to an output terminal of said regulator;
   d) instructing means for producing an instruction signal for stopping a supply of power by said regulator to said load circuit; and
   e) reset means for resetting said load circuit in response to an output of said instructing means at a time before the voltage level provided by said regulator to said load circuit drops below said predetermined voltage level.

6. A circuit according to claim 5, wherein said load circuit includes an electronic circuit which is reset by said reset means.

7. A circuit according to claim 6, wherein said electronic circuit includes a microcomputer.

8. A circuit according to claim 7, wherein said reset means resets said microcomputer before the power supply to said load circuit is turned off by said switching element.

* * * * *